United States Patent
Park et al.

(10) Patent No.: US 10,037,494 B2
(45) Date of Patent: Jul. 31, 2018

(54) APPARATUS FOR REPRESENTING SENSORY EFFECT AND METHOD THEREOF

(71) Applicant: Electronics and Telecommunications Research Institute, Daejeon (KR)

(72) Inventors: Sang-Wook Park, Daejeon (KR); Hyun-Jin Yoon, Daejeon (KR); Yong-Kwi Lee, Daejeon (KR); Jong-Hyun Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 400 days.

(21) Appl. No.: 14/706,729

(22) Filed: May 7, 2015

(65) Prior Publication Data
US 2015/0324701 A1    Nov. 12, 2015

(30) Foreign Application Priority Data
May 7, 2014 (KR) ........................ 10-2014-0054370

(51) Int. Cl.
*G06F 15/18* (2006.01)
*G06N 99/00* (2010.01)
*G06N 5/04* (2006.01)

(52) U.S. Cl.
CPC ........... *G06N 99/005* (2013.01); *G06N 5/047* (2013.01)

(58) Field of Classification Search
CPC .......... G06N 5/04; G06N 99/00; G06N 5/047; G06N 99/005

USPC ............................................... 706/12, 15, 45
See application file for complete search history.

(56) References Cited

U.S. PATENT DOCUMENTS

| | | | |
|---|---|---|---|
| 2012/0072938 A1 | 3/2012 | Seong et al. | |
| 2014/0108309 A1* | 4/2014 | Frank | G06N 99/005 706/12 |
| 2015/0004576 A1* | 1/2015 | Yoon | A61B 5/7264 434/236 |
| 2015/0248615 A1* | 9/2015 | Parra | A61B 5/7275 706/12 |

(Continued)

FOREIGN PATENT DOCUMENTS

| KR | 1020110118379 A | 10/2011 |
|---|---|---|
| KR | 1020120030789 A | 3/2012 |

(Continued)

*Primary Examiner* — David R Vincent
(74) *Attorney, Agent, or Firm* — William Park & Associates Ltd.

(57) ABSTRACT

Provided is a sensory effect representation apparatus including a collection unit configured to collect user status information about a user status, a storage unit configured to store sensory effects; an analysis unit configured to analyze the user status information to generate a user status prediction pattern, a sensory effect recommendation unit configured to recommend a sensory effect corresponding to the user status prediction pattern, from among the stored sensory effects; and a sensory effect provision unit configured to read a sensory effect corresponding to the sensory effect prediction pattern, from the storage unit and provide the read sensory effect. Accordingly, it is possible to provide a sensory effect appropriate for a user characteristic by predicting a user status and reflecting a feedback on a recommended sensory effect.

19 Claims, 6 Drawing Sheets

(56) References Cited

U.S. PATENT DOCUMENTS

2016/0082222 A1* 3/2016 Garcia Molina .... A61B 5/0482
600/27

FOREIGN PATENT DOCUMENTS

| KR | 101256748 B1 | 4/2013 |
| KR | 101305129 B1 | 9/2013 |

* cited by examiner

APPARATUS FOR REPRESENTING SENSORY EFFECT AND METHOD THEREOF

CROSS-REFERENCE TO RELATED APPLICATION

This application claims priority to and the benefit of Korean Patent Application No. 10-2014-0054370, filed on May 7, 2014, the disclosure of which is incorporated herein by reference in its entirety.

BACKGROUND

1. Field of the Invention

The present invention relates to an apparatus for representing a sensory effect and a method thereof, and more particularly, to an apparatus for representing a sensory effect and a method thereof, which may predict a user status and then recommend and provide a sensory effect for the user status.

2. Discussion of Related Art

Recently, four-dimensional (4D) theaters have been providing a sensory effect service for stimulating the five senses such as smell, touch, or the like, in order to provide multimedia content, and maximize a visual sense and an auditory sense through traditional video and audio apparatuses. In addition, providing multimedia content along with the sensory effect is considered to increase customer immersion and satisfaction in appreciating movies, compared to providing multimedia content based only on the visual and auditory senses of high image quality and high sound quality.

In general, a preference for the sensory effect differs from user to user. For example, if users feel wind while watching a scene in which it is windy, some of the users may further immerse themselves in the content scene, and others may feel inconvenienced and lose half their interest. This difference is caused because sensitivity to a windy effect among sensory effects differs from user to user.

Accordingly, there is a need for providing a method and an apparatus to overcome a difference between preferences for a positive influence on providing a sensory effect to a user.

A technology related to representation of a sensory effect is disclosed in Korean Patent Registration No. 10-1305129.

SUMMARY OF THE INVENTION

The present invention is directed to a sensory effect representation apparatus and method that may predict a user status and recommend a sensory effect for the user status.

The present invention is also directed to a sensory effect representation apparatus and method that receive and reflect a user response feedback on the recommended sensory effect for the predicted user.

According to an aspect of the present invention, there is provided a sensory effect representation apparatus including a collection unit configured to collect user status information about a user status, a storage unit configured to store sensory effects; an analysis unit configured to analyze the user status information to generate a user status prediction pattern, a sensory effect recommendation unit configured to recommend a sensory effect corresponding to the user status prediction pattern, from among the stored sensory effects; and a sensory effect provision unit configured to read a sensory effect corresponding to the sensory effect prediction pattern, from the storage unit, and provide the read sensory effect.

The sensory effect representation apparatus may further include a feedback unit configured to receive user status feedback information on the user status prediction pattern and reflect the user status feedback information to the user status prediction pattern to generate a user status pattern.

The sensory effect representation apparatus may further include a feedback unit configured to receive sensory effect feedback information on the sensory effect prediction pattern and reflect the sensory effect feedback information to the sensory effect prediction pattern to generate a sensory effect pattern.

The sensory effect representation apparatus may further include a user customization unit configured to analyze a user preference from the user status pattern, in which the sensory effect recommendation unit recommends the sensory effect pattern based on the user preference.

The sensory effect representation apparatus may further include a user customization unit configured to analyze a user preference from the sensory effect pattern, in which the sensory effect recommendation unit recommends the sensory effect pattern based on the user preference.

The storage unit may store a user status population pattern including user status patterns of other users, and the analysis unit may analytically compare the user status information with the user status population pattern to generate the user status prediction pattern.

The storage unit may store a user status population pattern including user status patterns of other users, the sensory effect representation apparatus may further include a similar population pattern extraction unit configured to extract a user status population pattern for another user having a similar characteristic to the user from the user status population pattern, and the analysis unit may analytically compare the user status information with the similar user status population pattern to generate the user status prediction pattern.

The sensory effect representation apparatus may further include a display unit configured to display the user status prediction pattern or the sensory effect prediction pattern.

The display unit may display a history including a previously generated user status prediction pattern or a previously generated sensory effect prediction pattern.

The sensory effect representation apparatus may further include a learning server configured to extract a user status prediction criterion for generating the user status prediction pattern, in which the analysis unit generates the user status prediction pattern based on the user status prediction criterion extracted by the learning server.

The learning server may perform learning based on the user status pattern to extract the user status prediction criterion.

The sensory effect representation apparatus may further include a learning server configured to extract a sensory effect prediction criterion for generating the sensory effect prediction pattern to recommend a sensory effect, in which the sensory effect recommendation unit recommends a sensory effect prediction pattern based on the sensory effect prediction criterion extracted by the learning server.

The learning server may perform learning based on the sensory effect pattern to extract the sensory effect prediction criterion.

According to another aspect of the present invention, there is provided a sensory effect representation apparatus including: a collection unit configured to collect first user status information and second user status information with respect to different types of user statuses; a storage unit configured to store sensory effects; an analysis unit configured to analyze the first user status information and the second user status information to generate a composite user status prediction pattern; a sensory effect recommendation unit configured to recommend a sensory effect corresponding to the composite user status prediction pattern among the stored sensory effects to generate a composite sensory effect prediction pattern; and a sensory effect provision unit configured to read a sensory effect corresponding to the composite sensory effect prediction pattern from the storage unit and provide the read sensory effect.

According to still another aspect of the present invention, there is provided a sensory effect representation method including: collecting user status information about a user status; storing sensory effects; analyzing the user status information to generate a user status prediction pattern; recommending a sensory effect corresponding to the user status prediction pattern, from among the stored sensory effects, to generate a sensory effect predication pattern; and reading a sensory effect corresponding to the sensory effect prediction pattern to provide the read sensory effect.

According to still another aspect of the present invention, there is provided a sensory effect representation method including: collecting first user status information and second user status information with respect to different types of user statuses; storing a pattern of sensory effects; analyzing the first user status information and the second user status information to generate a composite user status prediction pattern; recommending a sensory effect corresponding to the composite user status prediction pattern, from among the stored sensory effects, to generate a composite sensory effect prediction pattern; and reading a sensory effect corresponding to the composite sensory effect prediction pattern from the storage unit to provide the read sensory effect.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. Moreover, detailed descriptions related to well-known functions or configurations will be omitted in order not to unnecessarily obscure subject matters of the present invention. In describing the invention, to facilitate the entire understanding of the invention, like numbers refer to like elements throughout the description of the figures.

Figure 1:
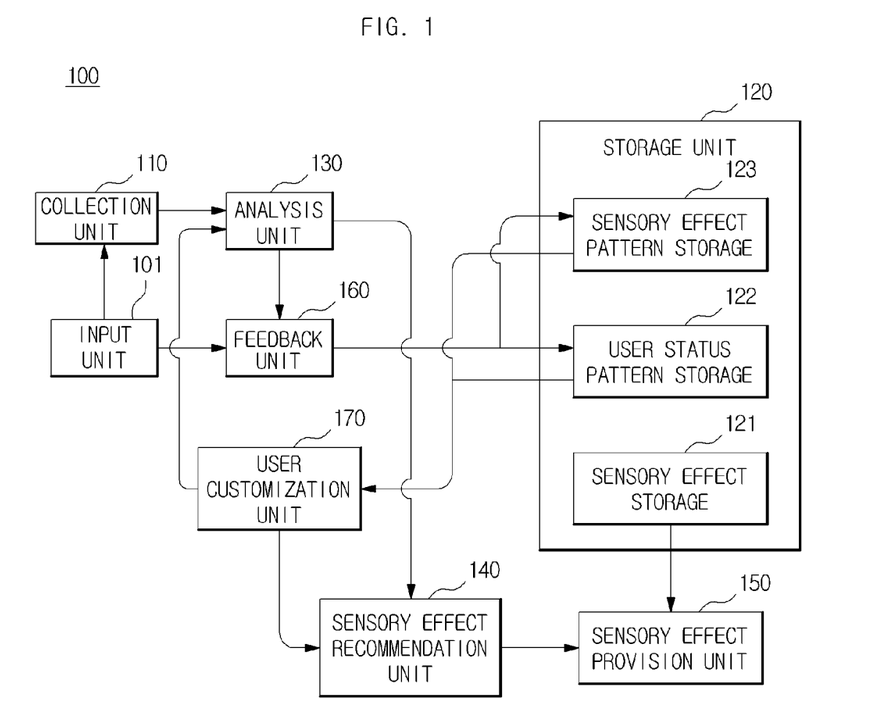
FIG. 1 is a block diagram showing a sensory effect representation apparatus according to an embodiment of the present invention.

FIG. 1 is a block diagram showing a sensory effect representation apparatus according to an embodiment of the present invention.

Referring to FIG. 1, a sensory effect representation apparatus 100 includes an input unit 101, a collection unit 110, a storage unit 120, an analysis unit 130, a sensory effect recommendation unit 140, a sensory effect provision unit 150, a feedback unit 160, and a user customization unit 170. The storage unit includes a sensory effect storage 121, a user status pattern storage 122, and a sensory effect pattern storage 123.

A user status denotes a physical or mental status of a user who uses the sensory effect representation apparatus 100 according to an embodiment of the present invention. The user status may include a static status or a dynamic status. The user status may include information about sleep, a biorhythm, and a state of health, which is static physical information, and information about an activity amount (an exercise amount and a daily activity amount), which is dynamic physical information.

User status information denotes all types of information that may be used to determine the user status. The user status information is evidential data that is patterned and used to predict the user status. For example, the user status information about sleep among the user's statuses may include, for example, a bedtime, a wake-up time, tossing and turning time, and times, the number of occasions, and durations of rapid eye movement (REM) sleep. The sensory effect representation apparatus 100 may determine a user status for sleep from user status information about the sleep. For example, user status information about an activity amount among the user statuses may include, for example, the number of steps of a user, a basal metabolic rate, and calories and a pulse rate required for basal metabolism. The sensory effect representation apparatus 100 may determine a user status for an activity amount from the user status information about the activity amount.

The collection unit 110 collects user status information about the user status. The collection unit 110 may be configured to collect information and preferably include a sensor. The collection unit 110 collects information corresponding to the user status information, which is evidential data used to analyze the user status. For example, the collection unit 110 may collect a bedtime, a wake-up time, tossing and turning time, times, the number of occasions, and durations of REM sleep, the number of steps of a user, a basal metabolic rate, and calories and a pulse rate required for basal metabolism, and the like to determine a user status on a sleep or activity amount.

The collection unit 110 may selectively collect some or all of the user status information. The collection unit receives selective-collection information including information related to the selective collection of the user status information.

A sensory effect is stored in the storage unit 120. A user status pattern to which the feedback unit 160 has reflected a feedback on the predicted user status and a sensory effect pattern to which the feedback unit 160 has reflected a feedback on the recommended sensory effect, other than the sensory effect, are stored in the storage unit 120. The sensory effect is stored in a sensory effect storage 121, the user status pattern is stored in a user status pattern storage 122, and the sensory effect pattern is stored in a sensory effect pattern storage 123.

The user status pattern is information on a result of determining a user status based on the user status information. The user status pattern includes information for determining the user status when the user status information has a specific value. For example, it is assumed that a user status pattern for sleep is generated. The analysis unit 130 may determine whether the user status is a deep sleep, tossing and turning, normal, or sleeplessness when a bedtime, a wake-up time, a tossing and turning time, and times, the number of occasions, and durations of rapid eye movement (REM) sleep have respective values. When the determination result of the analysis unit 130 is a deep sleep, an array of the specific values of the bedtime, the wake-up time, the tossing and turning time, and the times, the number, and the durations of rapid eye movement (REM) sleep may be a type of data pattern. The array of the specific values of user status information about the sleep and the result of the determination of the sleep by the analysis unit 130 constitute pattern information. Likewise, for a user status pattern for an activity amount, an array of the specific values of user status information about the activity amount and a result of determination of the activity amount by the analysis unit 130 constitute pattern information. Subsequently, the analysis unit 130 determines that the user status for the sleep is a deep sleep when analyzing user status information about the sleep that is required when the sleep is a deep sleep.

The sensory effect denotes an action on a user for improving the user status. Preferably, the sensory effect may be to stimulate five human senses. For example, the sensory effect may be meditation, a break, therapy, a diversion, activity, or exercise. When the sensory effect is a break, the sensory effect may be provided by generating wind for stimulating a tactile sense, playing music for stimulating an auditory sense, giving off smell or fragrance for stimulating an olfactory sense, and replaying a photo or video for stimulating a visual sense. The elements for stimulating the five senses may be used depending on a purpose of improving the user status. If the purpose of improving the user status is an exercise, the sensory effect may be provided by playing music having an active and fast tempo or giving off fragrance for arousing excitement.

A sensory effect pattern is information on a result of determining a sensory effect matched to the user status pattern. The sensory effect pattern includes information on a sensory effect added to a specific user status pattern. For example, it is assumed that a user status pattern for sleep and a sensory effect pattern corresponding thereto are generated. The sensory effect recommendation unit 140 extracts a sensory effect corresponding to the user status pattern for the sleep from sensory effects (for example, a meditation, a break, therapy, a diversion, activity, or exercise) stored in the sensory effect storage 121. If a recommended sensory effect is meditation, a specific value of user status information about sleep included in the user status pattern for the sleep, a result of determination of whether the sleep is a deep sleep, and the recommended sensory effect being meditation may constitute one data pattern. The data pattern may be a sensory effect pattern for the sleep. Likewise, the sensory effect recommendation unit 140 extracts a sensory effect corresponding to a user status pattern for an activity amount from the sensory effects stored in the sensory effect storage 121. If a recommended sensory effect is an exercise, a specific value of user status information about the activity amount, a result of determination of whether the activity amount is large or small, and the recommended sensory effect being an exercise may constitute one data pattern. The data pattern may be a sensory effect pattern for the activity amount.

The analysis unit 130 analyzes the user status information to generate a user status prediction pattern for predicting a user status. The analysis unit 130 receives the user status information from the collection unit 110. The analysis unit 130 transmits the user status prediction pattern to the sensory effect recommendation unit 140.

The sensory effect recommendation unit 140 recommends a sensory effect corresponding to the user status prediction pattern to generate a sensory effect prediction pattern. The sensory effect recommendation unit 140 receives the user status prediction pattern from the analysis unit 130 or receives a user preference pattern including a sensory effect preferred by a user from the user customization unit 170. The sensory effect recommendation unit 140 recommends a sensory effect stored in the sensory effect storage 121 based on the user status prediction pattern or the user preference pattern. For example, the sensory effect recommendation unit 140 may recommend any one of the meditation, a break, therapy, a diversion, activity, or exercise. The sensory effect recommendation unit 140 uses the recommended sensory effect to generate the sensory effect prediction pattern. The sensory effect recommendation unit 140 transmits the sensory effect prediction pattern to the sensory effect provision unit 150. The sensory effect provision unit 150 reads a sensory effect corresponding to the sensory effect prediction pattern from the sensory effect storage 121 and provides the read sensory effect to a user.

The sensory effect provision unit 150 may be configured to provide a sensory effect that stimulates an auditory sense during meditation by representing music content for increasing serenity of a user, provide a sensory effect that gives off an aromatic fragrance having a relaxing effect during a break, provide a vibration/motion effect using a massage chair during a therapy, provide an effect that decreases a daily activity amount during a diversion, provide an effect that increases the daily activity amount during an activity, or provide sensory content that may increase an activity amount during an exercise.

The feedback unit 160 may perform feedback on the user status prediction pattern through a user's response to the user status prediction pattern or perform feedback on the sensory effect prediction pattern through the sensory effect prediction pattern. Specifically, the feedback unit 160 receives user status feedback information including feedback on the user status prediction pattern, reflects the user status feedback information to the user status prediction pattern thereof, generates a user status pattern through modification or filtering, and stores the user status pattern in the user status pattern storage 122. In addition, the feedback unit 160 receives sensory effect feedback information including a feedback on the sensory effect prediction pattern, reflects the sensory effect feedback information to the sensory effect prediction pattern, generates a sensory effect pattern through modification or filtering thereof, and stores the sensory effect pattern in the sensory effect pattern storage 123. The stored user status pattern and sensory effect pattern are new analysis criteria for a time when the analysis unit 130 generates a user status prediction pattern and for a time when the sensory effect recommendation unit 140 generates a sensory effect prediction pattern, respectively.

The user customization unit 170 analyzes (learns) a user status pattern and a sensory effect pattern appropriate for personal characteristics from the user status pattern and the sensory effect pattern. The user customization unit 170 analyzes a user preference for a user personal characteristic from the stored user status pattern and sensory effect pattern.

The user customization unit 170 generates a user preference pattern and transmits the generated user preference pattern to the sensory effect recommendation unit 140. The sensory effect recommendation unit 140 recommends a sensory effect based on the user preference pattern. The user customization unit 170 allows the sensory effect recommendation unit 140 to recommend a sensory effect that is more consistent with a user's characteristic. The user customization unit 170 generates a user preference pattern and transmits the generated user preference pattern to the analysis unit 130. The analysis unit 130 generates a user status prediction pattern based on the user preference pattern. The user customization unit 170 allows the analysis unit 130 to analyze a user status prediction pattern that is more consistent with a user's characteristic.

An input unit 101 receives and transmits user status feedback information including feedback on the user status prediction pattern and sensory effect feedback information including feedback on the sensory effect prediction pattern to feedback unit 160. The input unit 101 selectively receives user status information to be collected by the collection unit 110 or user status information to be displayed by a display unit 190. The input unit 101 transmits, to the collection unit 110, selection collection information about the user status information to be selectively collected and transmits, to the display unit 190, selection display information about the user status information to be selectively displayed.

Figure 2:
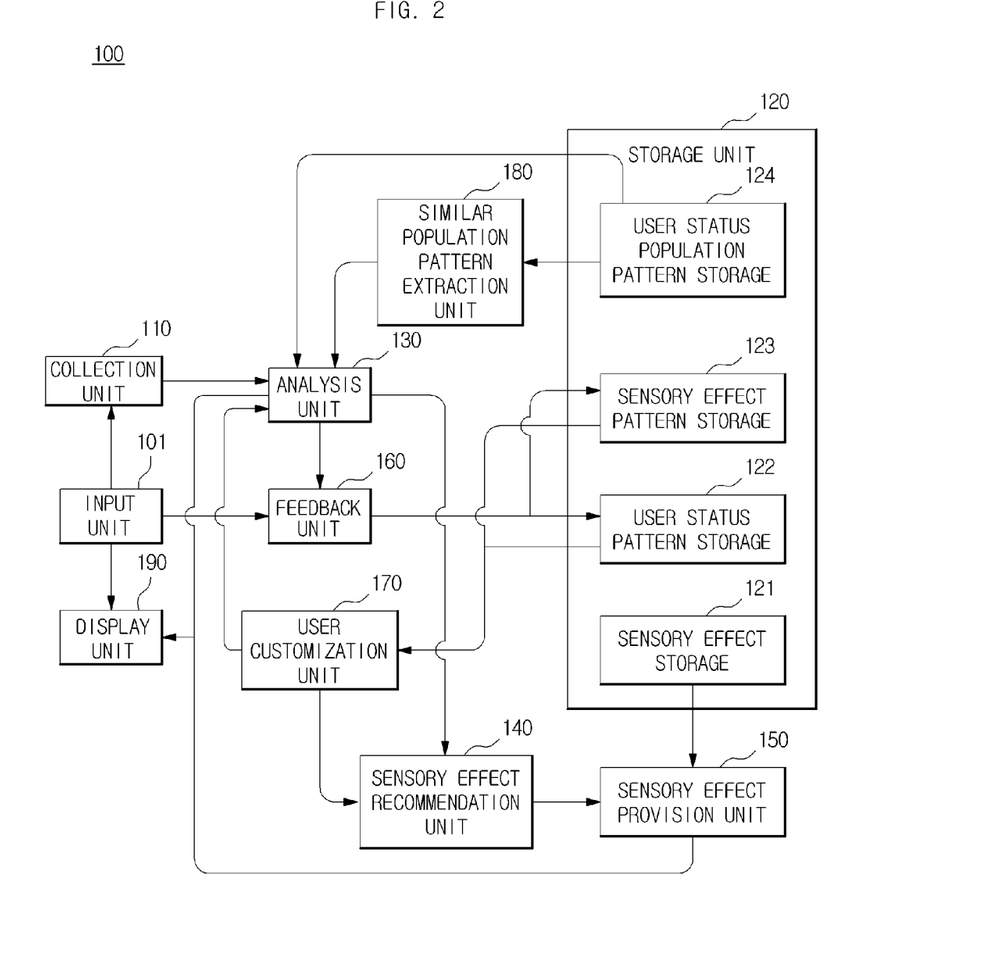
FIG. 2 is a block diagram showing a sensory effect representation apparatus that generates a user status prediction pattern from a user status population pattern according to another embodiment of the present invention.

FIG. 2 is a block diagram showing a sensory effect representation apparatus that generates a user status prediction pattern from a user status population pattern according to another embodiment of the present invention.

Referring to FIG. 2, the sensory effect representation apparatus 100 may further include a similar population pattern extraction unit 180, a display unit 190, and a user status population pattern storage 124 that is included in the storage unit 120.

The user status population pattern storage 124 stores a user status population pattern including user status patterns of other users. The user status population pattern denotes a pattern that is a comparison criterion for a time when the user status prediction pattern is generated. The analysis unit 130 compares the received user status information with the user status population to determine a user status. For example, it is assumed that a result of determining a user status included in a user status population for sleep is sleeplessness. If the input user status information is similar to the user status information included in the user status population pattern for the sleep, the analysis unit 130 may determine that the user status of the received user status information is sleeplessness and generate a user status prediction pattern including the sleeplessness.

The similar population pattern extraction unit 180 extracts a user status population pattern for another user having a similar characteristic to the user from the user status population pattern to generate a similar user status population pattern. The similar population pattern extraction unit 180 transmits the similar user status population pattern to the analysis unit 130. Since the similar user status population pattern is based on another user having a characteristic that is common or similar to the user, a probability of the user status prediction pattern being consistent with a user's response further increases. The common or similar characteristic between the user and another user may include personality, gender, a residence, an education level, and an income level. The analysis unit 130 compares the received user status information with the similar user status population pattern to determine a user status, and generate a user status prediction pattern.

The display unit may display a user status item (type), a user status prediction pattern, a sensory effect prediction pattern, or received user status information. The display unit 190 may display a previous user status item (type), a previous user status prediction pattern, a previous sensory effect prediction pattern, or previously received user status information in addition to a current user status item (type), a current user status prediction pattern, a current sensory effect prediction pattern, or currently received user status information. The display unit 190 may display histories that have been previously predicted.

The display unit 190 may selectively display some or all of the user status information. The display unit 190 receives selection display information including information related to selective display of the user status information.

Figure 3:
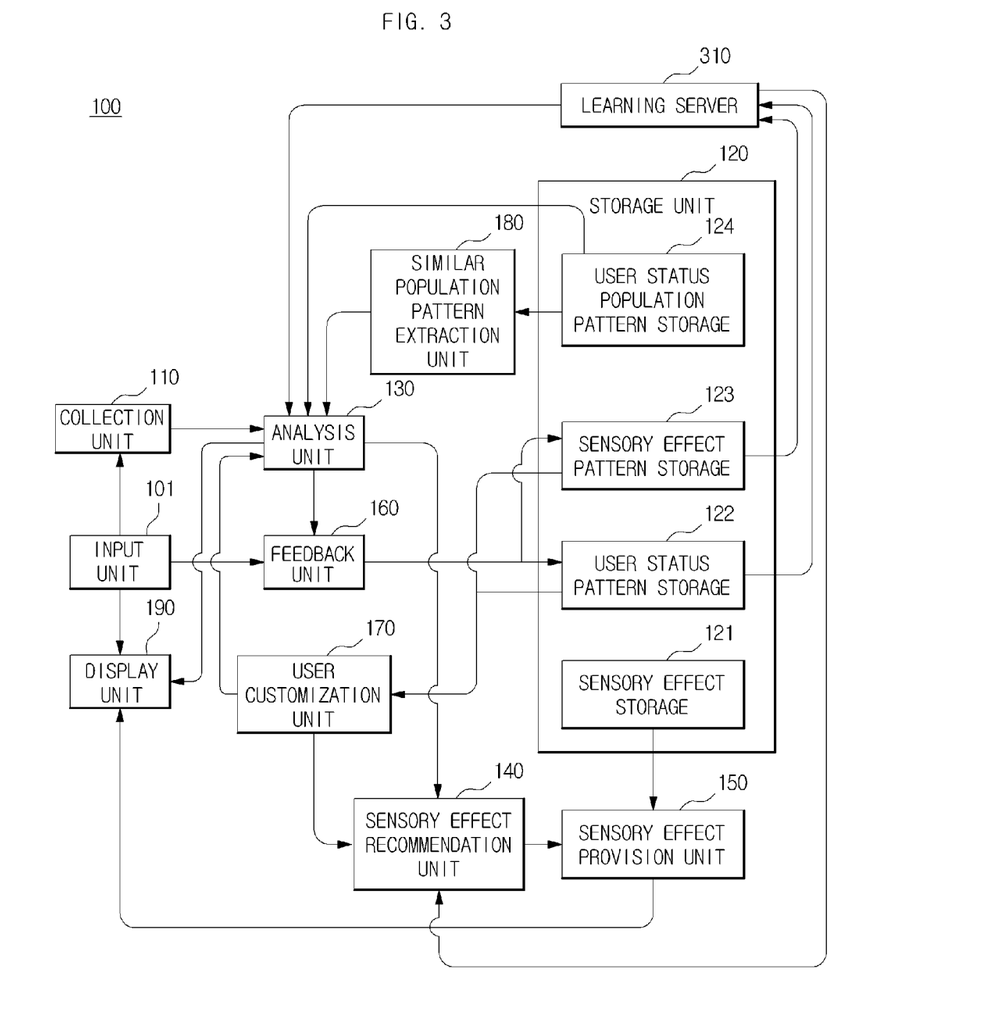
FIG. 3 is a block diagram showing a sensory effect representation apparatus that generates a user status prediction pattern from a learning server according to another embodiment of the present invention.

FIG. 3 is a block diagram showing a sensory effect representation apparatus that generates a user status prediction pattern from a learning server according to another embodiment of the present invention.

Referring to FIG. 3, a sensory effect representation apparatus 100 further includes a learning server 310. Detailed descriptions of an input unit 101, a collection unit 110, a storage unit 120, a user status population pattern storage 124, an analysis unit 130, a sensory effect recommendation unit 140, a sensory effect provision unit 150, a feedback unit 160, a user customization unit 170, a similar population pattern extraction unit 180, and a display unit 190 are omitted here since they have been described with reference to FIG. 1 and FIG. 2.

The learning server 310 extracts a user status prediction criterion for generating a user status prediction pattern. The learning server 310 learns the user status prediction criteria based on a user status pattern stored in a user status pattern storage 122. The learning of the learning server 310 means that the learning server 310 uses a user status pattern that is closer to a preference of a user by reflecting a feedback to generate a criterion of the user status prediction pattern. When the learning server 310 generates the user status prediction criterion closer to the preference of the user to transmit the generated user status prediction criterion to an analysis unit 130, the analysis unit 130 may use the transmitted user status information to generate a user status prediction pattern that is further closer to the preference of the user. The learning server 310 may be self-developed through continuous feedbacks on the user status prediction pattern.

The learning server 310 extracts a sensory effect prediction criterion for generating a sensory effect prediction pattern. The learning server 310 learns the sensory effect prediction criterion by learning the sensory effect prediction criterion based on a sensory effect pattern stored in a sensory effect pattern storage 123. The learning server 310 learning the sensory effect pattern means that the learning server 310 uses a sensory effect pattern that is closer to a preference of a user by reflecting a feedback to generate a criterion of the sensory effect prediction pattern. When the learning server 310 generates the sensory effect prediction criterion closer to the preference of the user to transmit the generated user sensory effect prediction criterion to a sensory effect recommendation unit 140, the sensory effect recommendation unit 140 may use the transmitted user status prediction pattern or a user preference pattern to generate a sensory effect prediction pattern that is further closer to the preference of the user. The learning server 310 may be self-developed through continuous feedbacks on the sensory effect prediction pattern.

Figure 4:
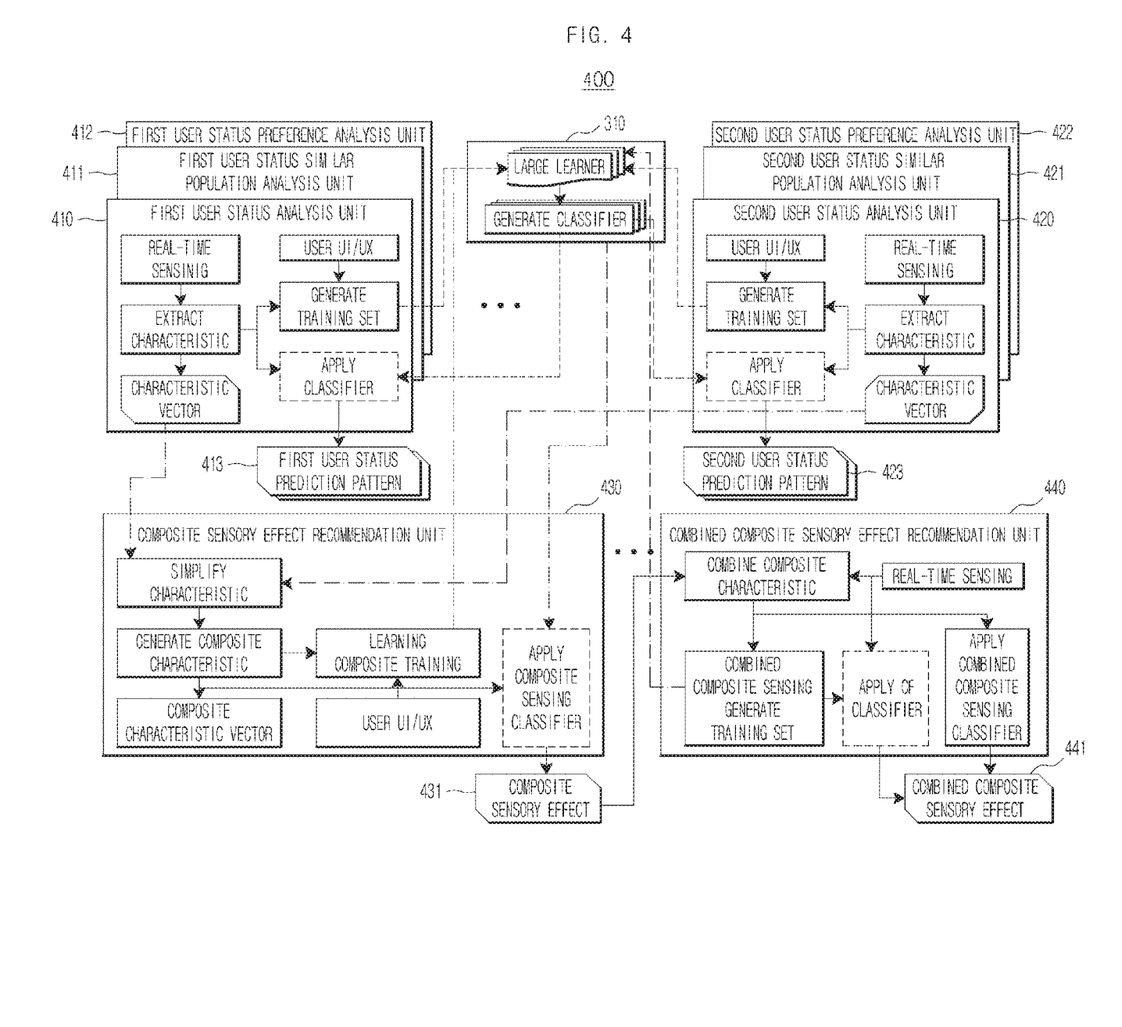
FIG. 4 is a detailed block diagram showing a sensory effect representation apparatus that generates a composite sensory effect pattern according to another embodiment of the present invention.

FIG. 4 is a detailed block diagram showing a sensory effect representation apparatus that generates a composite sensory effect pattern according to another embodiment of the present invention.

FIG. 4 shows a sensory effect representation apparatus 400 that recommends and provides a sensory effect based on user status information about a plurality of users with respect to different types of user statuses. The sensory effect representation apparatus 400 includes a first user status analysis unit 410, a second user status analysis unit 420, a composite sensory effect recommendation unit 430, and a combined composite sensory effect recommendation unit 440.

The sensory effect representation apparatus 400 may compositely analyze the different types of user statuses to recommend and provide a sensory effect based thereon. The different types of user statuses may include at least one of sleep, a biorhythm, a state of health, and an activity amount (an exercise amount and a daily activity amount).

The first user status analysis unit 410 and the second user status analysis unit 420 each have the same function as an input unit 101, a collection unit 110, an analysis unit 130, a feedback unit 160, and a display unit 190 of the sensory effect representation apparatus 100, but analyze different user statuses. For example, the first user status analysis unit 410 may analyze a user status for the sleep, and the second user status analysis unit 420 may analyze a user status for the activity amount.

The first user status analysis unit 410 includes a first user status similar population analysis unit 411 and a first user status preference analysis unit 412. The first user status analysis unit 410 collects first user status information collected by the collection unit 110 through real-time sensing and extracts a characteristic of the first user status information. The first user status analysis unit 410 may represent the characteristic of the first user status information as a characteristic vector $(X_i=X_{i1}, X_{i2}, \ldots, X_{in})$. The first user status analysis unit 410 receives feedback information on the first user status prediction pattern through the input unit 101 and a user UI/UX corresponding to the display unit 190 and reflects the feedback information to the first user status information from which the characteristic has been extracted, to generate a training set corresponding to the user status pattern. The training set is transmitted to the learning server 310. The first user status analysis unit 410 receives a classifier corresponding to the user status prediction criterion from the learning server 310 and applies the classifier to the first user status information from which the characteristic has been extracted, to generate a first user status prediction pattern 413. Similar to as described above, the user status similar population analysis unit 411 analytically compares the first user status information with a user status similar population pattern to generate the first user status prediction pattern 413. Similar to as described above, the first user status preference analysis unit 412 analytically compares the first user status information with a first user preference pattern to generate the first user status prediction pattern 413.

The second user status analysis unit 420 includes a second user status similar population analysis unit 421 and a second user status preference analysis unit 422. The second user status analysis unit 420 collects second user status information collected by the collection unit 110 through real-time sensing and extracts a characteristic of the second user status information. The second user status analysis unit 420 may represent the characteristic of the second user status information as a characteristic vector $(X_j=X_{j1}, X_{j2}, \ldots, X_{jn})$. The second user status analysis unit 420 receives feedback information on the second user status prediction pattern through the input unit 101 and a user UI/UX corresponding to the display unit 190 and reflects the feedback information to the second user status information from which the characteristic has been extracted, to generate a training set corresponding to the user status pattern. The training set is transmitted to the learning server 310. The second user status analysis unit 420 receives a classifier corresponding to the user status prediction criterion from the learning server 310 and applies the classifier to the second user status information from which the characteristic has been extracted, to generate a second user status prediction pattern 423. Similar to as described above, the second user status preference analysis unit 422 analytically compares the second user status information with a second user preference pattern to generate the second user status prediction pattern 423.

The composite sensory effect recommendation unit 430 generates a composite sensory effect pattern based on the first user status information and the second user status information. The composite sensory effect recommendation unit 430 receives the first user status information and the second user status information and simplifies characteristics thereof to generate a composite characteristic. The composite sensory effect recommendation unit 430 may represent the composite characteristic as a composite characteristic vector. The composite sensory effect recommendation unit 430 receives feedback information on the composite sensory effect prediction pattern through the input unit 101 and a user UI/UX corresponding to the display unit 190 and reflects the feedback information to the composite sensory effect prediction pattern from which the characteristic has been extracted, to generate a composite training set corresponding to the composite sensory effect pattern. The composite training set is transmitted to the learning server 310. The composite sensory effect recommendation unit 430 receives a classifier corresponding to a composite sensory effect prediction criterion from the learning server 310 and applies the classifier to the composite sensory effect prediction pattern from which the characteristic has been extracted, to generate a composite sensory effect pattern 431.

The combined composite sensory effect recommendation unit 440 combines third user status information to the composite sensory effect pattern 431 generated by the composite sensory effect recommendation unit 430 to generate a combined composite sensory effect pattern 441. The combined composite sensory effect recommendation unit 440 generates the combined composite sensory effect pattern 441 based on the composite sensory effect pattern 431 and the third user status information. The combined composite sensory effect recommendation unit 440 receives the first user status information, the second user status information, and the third user status information and simplifies characteristics thereof to generate a combined composite characteristic. The third user status information may be other real-time sensing information. The combined composite sensory effect recommendation unit 440 receives feedback information on the combined composite sensory effect prediction pattern through the input unit 101 and a user UI/UX corresponding to the display unit 190 and reflects the feedback information to the combined composite sensory effect prediction pattern from which the characteristic has been extracted, to generate a combined composite training set corresponding to the combined composite sensory effect pattern. The combined composite training set is transmitted to the learning server 310. The combined composite sensory effect recommendation unit 440 receives a combined composite sensing classifier corresponding to a combined composite sensory effect prediction criterion from the learning server 310 and applies the combined composite sensing classifier to the combined composite sensory effect prediction pattern from which the characteristic has been extracted, to generate the combined composite sensory effect pattern 441. The combined composite sensory effect recommendation unit 440 may include a collaborative filtering (CF) classifier in addition to the combined composite sensing classifier. The CF classifier analyzes user patterns of other users having a similar characteristic to the user to generate another user status prediction pattern criterion. The user status prediction pattern criterion of the CF classifier is used to generate the combined composite sensory effect pattern 441.

As shown in this drawing, sleep and a daily activity amount are described as examples of the first user status and the second user status, respectively. A combined composite user status prediction pattern and a composite sensory effect prediction pattern are generated by combining the first user status and the second user status. The present invention is not limited thereto, and a plurality of user statuses, i.e., a first user status to an Nth user status (N is a positive integer) may be combined.

Figure 5:
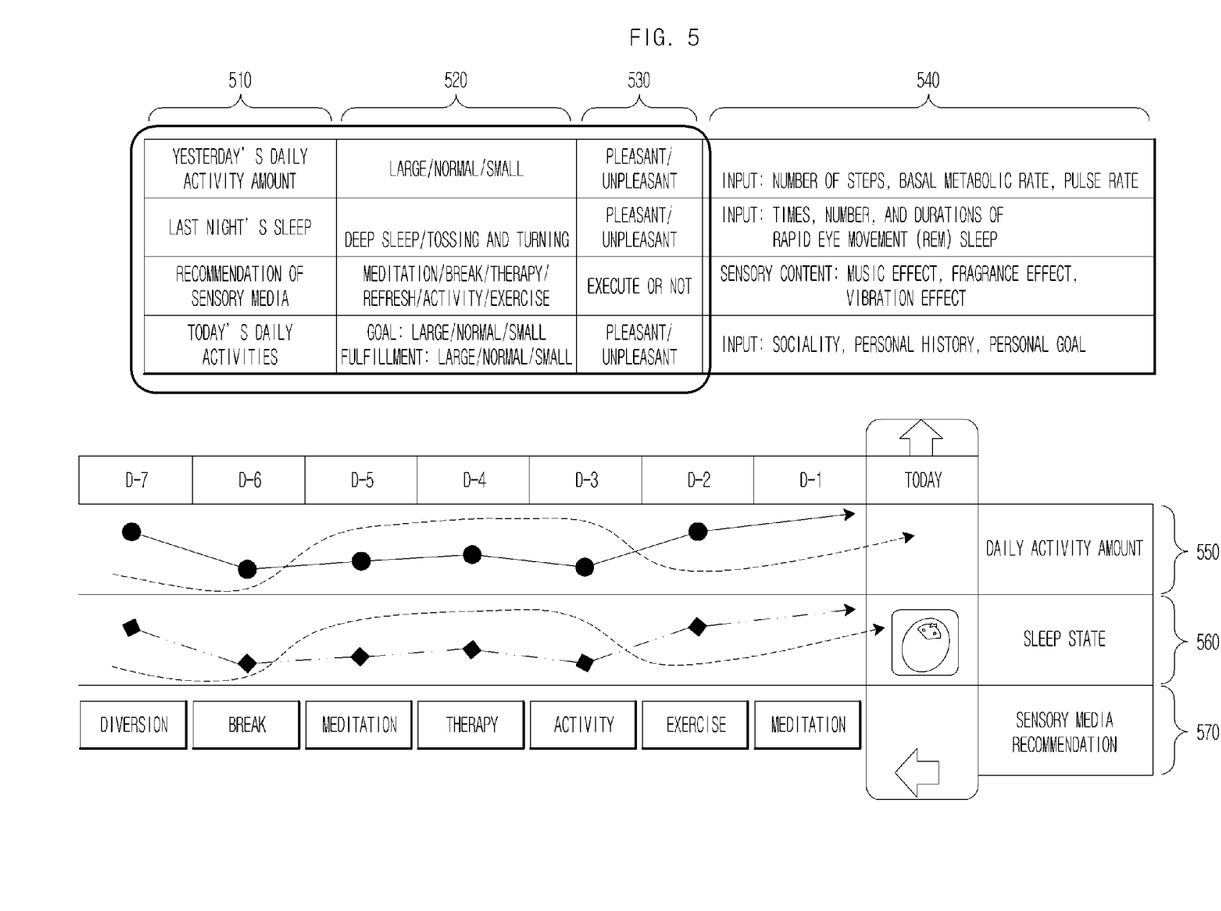
FIG. 5 is an exemplary diagram showing a display unit of a sensory effect representation apparatus according to an embodiment of the present invention.

FIG. 5 is an exemplary diagram showing a display unit of a sensory effect representation apparatus according to an embodiment of the present invention.

FIG. 5 shows a user status item (type), a user status prediction pattern, a sensory effect prediction pattern, received user status information, and feedback information.

The display unit may be configured with representations associated with a single day. The representation associated with a single day may include an item 510, pattern and recommendation contents 520, feedback information 530, and received user status information or a recommended sensory effect 540.

In a user status for yesterday's daily activity amount, the user status pattern is displayed as "large," "normal," or "small," the feedback information is displayed as "pleasant" or "unpleasant," and user status information for the daily activity amount (the number of steps, a basal metabolic rate, and a pulse rate), which is selectively received, is displayed.

In a user status for last night's sleep, the user status pattern is displayed as "a deep sleep" or "tossing and turning," the feedback information is displayed as "pleasant" or "unpleasant," and user status information for the sleep (times, the number of occasions, and durations of rapid eye movement (REM) sleep), which is selectively received, is displayed.

In a user status for today's daily activities, the user status pattern is displayed as "large," "normal," or "small," the feedback information is displayed as "pleasant" or "unpleasant," and user status information for the daily activities (a social activity, a personal history, and a personal goal), which is selectively received, is displayed.

For recommendation of sensory media, the sensory effect pattern is displayed as meditation, a break, therapy, a diversion, activity, or exercise, the feedback information is displayed as whether to execute or not, and a sensory effect included in the sensory effect pattern, which is selectively received, is displayed.

The display unit may be configured with representations associated with a past personal history. The past personal history includes a daily activity amount indication 550, a sleep state indication 560, and a sensory media recommendation indication 570. FIG. 5 shows the past personal history from a week ago to today.

In the daily activity amount indication 550, a daily activity amount user status prediction pattern that is analyzed by the sensory effect representation apparatus from a week ago to today is displayed as a solid line, and feedback information on the daily activity amount user status prediction pattern is displayed as a dotted line. In FIG. 5, considering the space between the daily activity amount user status prediction pattern and the feedback information, it may be determined that there is a difference in accuracy therebetween.

In the sleep state indication 560, a sleep user status prediction pattern that is analyzed by the sensory effect representation apparatus 100 from a week ago to today is displayed as a dashed-double-dot line, and feedback information on the sleep user status prediction pattern is displayed as a dotted line. In FIG. 5, considering the space between the sleep user status prediction pattern and the feedback information, it may be determined that there is a difference in accuracy therebetween.

The sensory media recommendation indication 570 displays sensory effects that have been recommended from a week ago to today. A sensory effect recommendation unit of the sensory effect representation apparatus has generated the sensory effect prediction pattern in the order of a diversion, a break, meditation, therapy, activity, and meditation.

Figure 6:
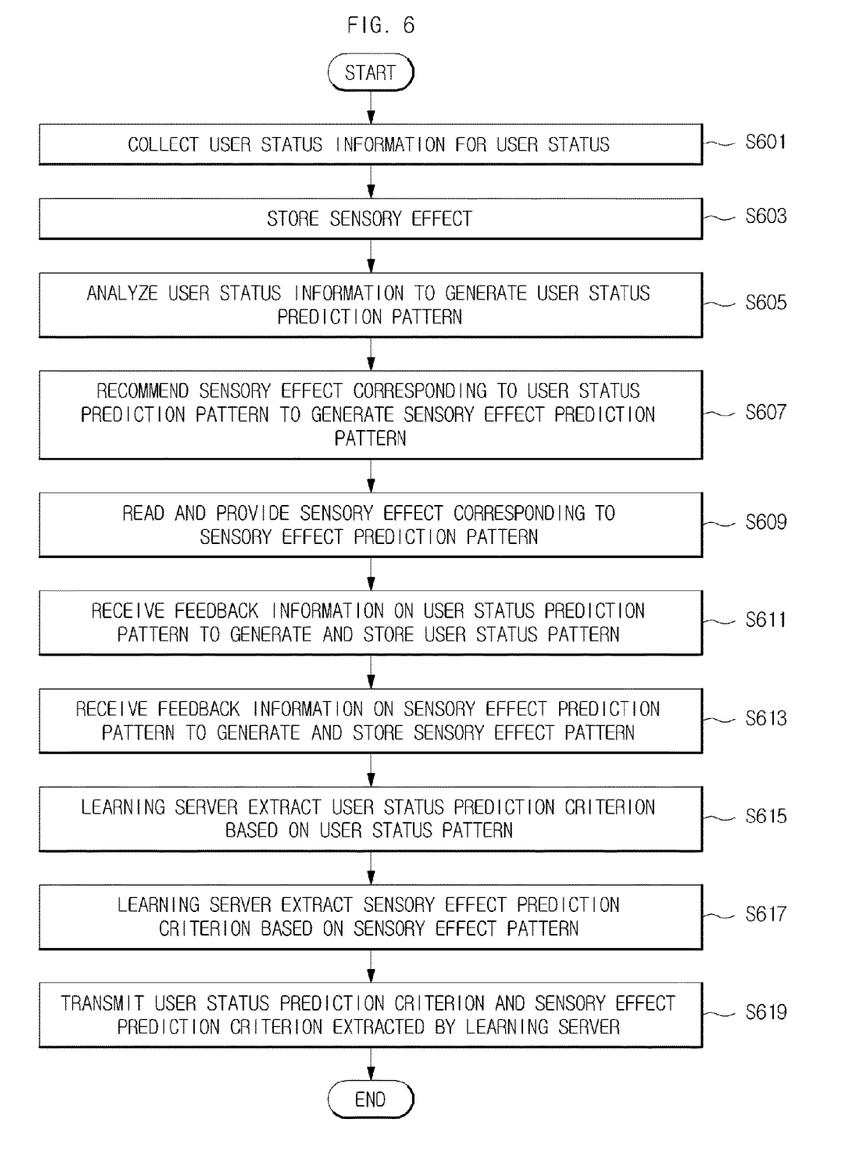
FIG. 6 is a flowchart showing a sensory effect representation method according to another embodiment of the present invention.

FIG. 6 is a flowchart showing a sensory effect representation method according to another embodiment of the present invention.

FIG. 6 shows a flow of a method of the sensory effect representation apparatus predicting a user status and recommending a sensory effect for the user status.

In operation S601, the collection unit collects user status information about the user status.

In operation S603, a sensory effect is stored in the sensory effect storage of the storage unit.

In operation S605, the analysis unit analyzes the user status information and determines the user status to generate a user status prediction pattern.

In operation S607, the sensory effect recommendation unit recommends a sensory effect corresponding to the user status prediction pattern to generate a sensory effect prediction pattern including the recommended sensory effect. The sensory effect recommendation unit transmits the sensory effect prediction pattern to the sensory effect provision unit.

In operation S609, the sensory effect provision unit reads a sensory effect corresponding to the sensory effect prediction pattern from the sensory effect storage and provides the read sensory effect.

In operation S611, the feedback unit receives feedback information on the user status prediction pattern to generate a user status pattern, and stores the generated user status pattern in the user status pattern storage.

In operation S613, the feedback unit receives feedback information on the sensory effect prediction pattern to generate a sensory effect pattern, and stores the generated sensory effect pattern in the sensory effect pattern storage.

In operation S615, the learning server extracts a user status prediction criterion that is a criterion for generating a user status prediction pattern based on the user status pattern. The learning server transmits the user status prediction pattern to the analysis unit.

In operation S617, the learning server extracts a sensory effect prediction criterion that is a criterion for generating a sensory effect prediction pattern based on the sensory effect pattern. In operation S619, the learning server transmits the user status prediction criterion and the sensory effect prediction criterion to the analysis unit.

According to embodiments of the present invention, it is possible to provide a sensory effect appropriate for a user characteristic by predicting a user status and reflecting a feedback on a recommended sensory effect.

It is also possible to keep a user's physical or mental state healthy by providing a sensory effect appropriate for the user characteristic and analyzing a user status.

Although the present invention has been described with reference to preferred embodiments, it should be understood by those skilled in the art that the present invention can be modified and changed in various ways without departing from the technical principles and scope of the present invention defined by the appended claims.

What is claimed is:

1. A sensory effect representation apparatus comprising:
   a processor; and
   a memory storing program code, executed by the processor, the program code comprising instructions for:
   collecting user status information about a user status;
   storing sensory effects;
   analyzing the user status information to generate a user status prediction pattern;
   recommending a sensory effect corresponding to the user status prediction pattern, from among the stored sensory effects, to generate a sensory effect prediction pattern;
   reading a sensory effect corresponding to the sensory effect prediction pattern, from among the stored sensory effects,
   providing the read sensory effect to the user; and
   receiving user status feedback information on the user status prediction pattern and reflecting the user status feedback information to the user status prediction pattern to generate a user status pattern,
   wherein the sensory effects and read sensory effect are one or more stimulants of the human senses, and
   wherein the user status pattern includes information for determining a user status in response to the user status information having a specific value.

2. The sensory effect representation apparatus of claim 1, wherein the program code further comprises instructions for:
   receiving sensory effect feedback information on the sensory effect prediction pattern and
   reflecting the sensory effect feedback information to the sensory effect prediction pattern to generate a sensory effect pattern.

3. The sensory effect representation apparatus of claim 1,
   wherein the program code further comprises instructions for analyzing a user preference from the user status pattern, and
   wherein the recommending the sensory effect pattern is based on the user preference.

4. The sensory effect representation apparatus of claim 2,
   wherein the program code further comprises instructions for analyzing a user preference from the sensory effect pattern, and
   wherein the recommending the sensory effect pattern is based on the user preference.

5. The sensory effect representation apparatus of claim 1, wherein the program code further comprises instructions for:
   storing a user status population pattern including user status patterns of other users, and
   analytically comparing the user status information with the user status population pattern to generate the user status prediction pattern.

6. The sensory effect representation apparatus of claim 1, wherein the program code further comprises instructions for:
   storing a user status population pattern including user status patterns of other users,
   extracting a user status population pattern for another user having a similar characteristic to the user, from the user status population pattern, and
   analytically comparing the user status information with the similar user status population pattern to generate the user status prediction pattern.

7. The sensory effect representation apparatus of claim 1,
   wherein the program code further comprises instructions for extracting a user status prediction criterion for generating the user status prediction pattern, and
   wherein generating the user status prediction pattern is based on the user status prediction criterion.

8. The sensory effect representation apparatus of claim 7, wherein the program code further comprises instructions for performing learning based on the user status pattern to extract the user status prediction criterion.

9. The sensory effect representation apparatus of claim 1,
   wherein the program code further comprises instructions for extracting a sensory effect prediction criterion for generating the sensory effect prediction pattern to recommend a sensory effect, and
   wherein the recommending a sensory effect prediction pattern is based on the sensory effect prediction criterion.

10. The sensory effect representation apparatus of claim 9, wherein the program code further comprises instructions for performing learning based on the sensory effect pattern to extract the sensory effect prediction criterion.

11. A sensory effect representation apparatus comprising:
    a processor; and
    a memory storing program code, executed by the processor, the program code comprising instructions for:
    collecting first user status information and second user status information with respect to different types of user statuses;
    storing sensory effects;
    analyzing the first user status information and the second user status information to extract a characteristic of the first user status information and a characteristic of the second user status information;
    generating a composite characteristic based on the characteristic of the first user status information and the characteristic of the second user status information;

recommending a sensory effect corresponding to the composite characteristic, from among the stored sensory effects, to generate a composite sensory effect prediction pattern;

reading a sensory effect corresponding to the composite sensory effect prediction pattern, from among the stored sensory effects, and providing the read sensory effect to a user, wherein the sensory effects and read sensory effect are one or more stimulants of the human senses, and wherein the characteristic of the first user status information and the characteristic of the second user status information are represented by characteristic vectors.

12. The sensory effect representation apparatus of claim 11, wherein the program code further comprises instructions for receiving composite user status feedback information and reflecting the composite user status feedback information to the composite user status information, to generate a training set.

13. The sensory effect representation apparatus of claim 11, wherein the program code further comprises instructions for receiving composite sensory effect feedback information on the composite sensory effect prediction pattern and reflecting the composite sensory effect feedback information to the composite sensory effect prediction pattern to generate a composite training set.

14. The sensory effect representation apparatus of claim 12,
wherein the program code further comprises instructions for extracting a composite user status prediction criterion based on the training set, and
wherein the generating a composite user status prediction pattern is based on the composite user status prediction criterion.

15. The sensory effect representation apparatus of claim 14, wherein the program code further comprises instructions for performing learning based on the training set to extract the composite user status prediction criterion.

16. The sensory effect representation apparatus of claim 13,
wherein the program code further comprises instructions for extracting a composite sensory effect prediction criterion based on the composite training set, and
wherein the generating a composite sensory effect pattern is based on the composite sensory effect prediction criterion.

17. The sensory effect representation apparatus of claim 16, wherein the program code further comprises instructions for performing learning based on the composite training set to extract the composite sensory effect prediction criterion.

18. A method of representing sensory effect comprising:
collecting user status information about a user status;
storing sensory effects;
analyzing the user status information to generate a user status prediction pattern;
recommending a sensory effect corresponding to the user status prediction pattern, from among the stored sensory effects, to generate a sensory effect prediction pattern;
reading a sensory effect corresponding to the sensory effect prediction pattern from among the stored sensory effects,
providing the read sensory effect to the user; and
receiving user status feedback information on the user status prediction pattern and reflecting the user status feedback information to the user status prediction pattern to generate a user status pattern,
wherein the sensory effect and read sensory effect are one or more stimulants of the human senses, and
wherein the user status pattern includes information for determining a user status in response to the user status information having a specific value.

19. A method of representing a sensory effect comprising:
collecting first user status information and second user status information with respect to different types of user statuses;
storing sensory effects;
analyzing the first user status information and the second user status information to extract a characteristic of the first user status information and a characteristic of the second user status information;
generating a composite characteristic based on the characteristic of the first user status information and the characteristic of the second user status information;
recommending a sensory effect corresponding to the composite characteristic, from among the stored sensory effects, to generate a composite sensory effect prediction pattern;
reading a sensory effect corresponding to the composite sensory effect prediction pattern, from among the stored sensory effects, and
providing the read sensory effect to a user,
wherein the sensory effects and read sensory effect are one or more stimulants of the human senses, and
wherein the characteristic of the first user status information and the characteristic of the second user status information are represented by characteristic vectors.

* * * * *